Patented Feb. 23, 1926.

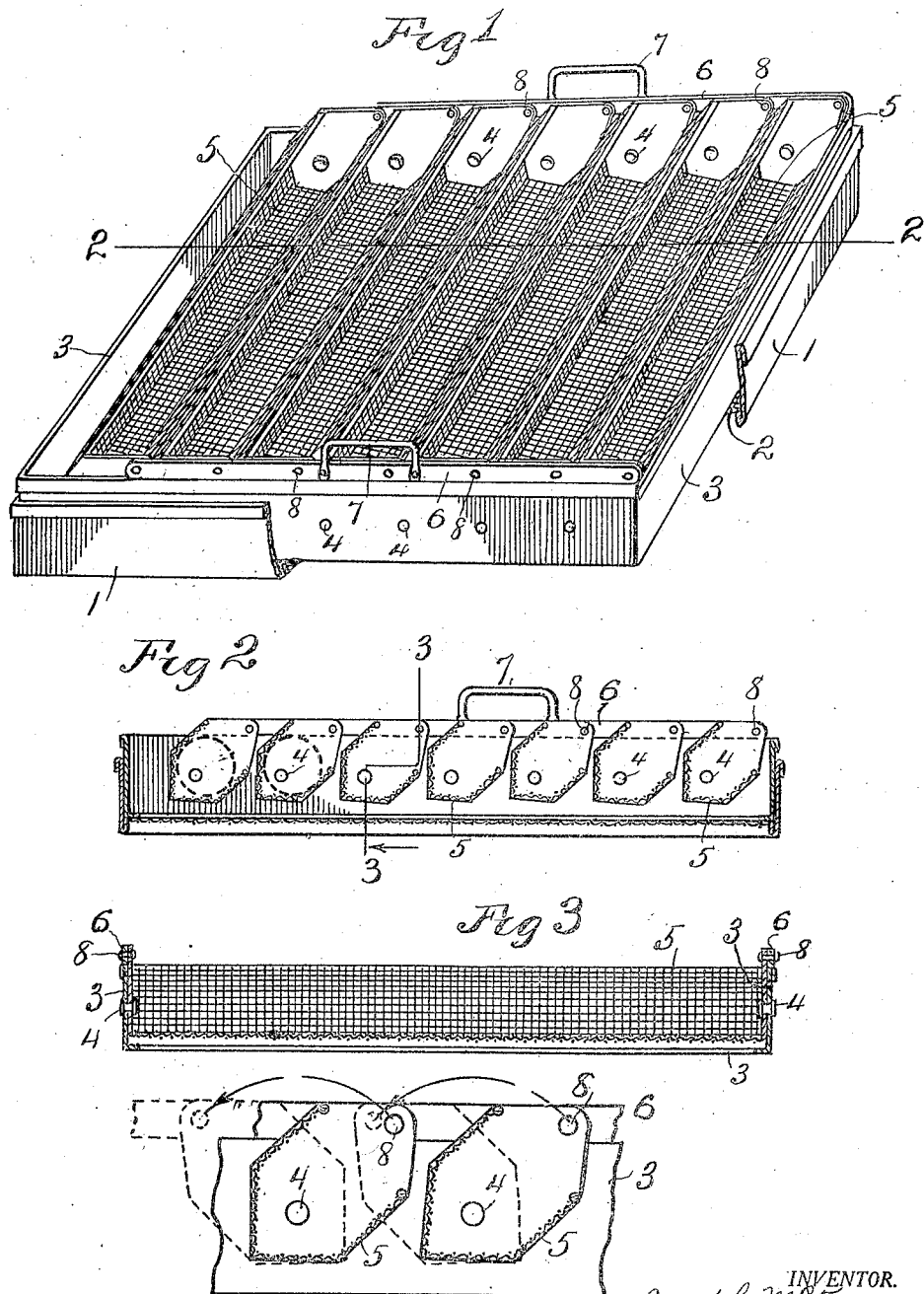

1,574,401

UNITED STATES PATENT OFFICE.

JOSEPH McKEON, OF INDEPENDENCE, MISSOURI.

EGG-TURNING DEVICE FOR INCUBATORS.

Application filed January 19, 1925. Serial No. 3,213.

*To all whom it may concern:*

Be it known that I, JOSEPH McKEON, a citizen of the United States, residing at Independence, in the county of Jackson and State of Missouri, have invented a certain new and useful Improvement in Egg-Turning Devices for Incubators, of which the following is a specification.

My invention relates to improvements in egg turning devices for incubators.

One of the objects of my invention is to provide an egg turning device, by means of which a holder for eggs to be hatched may be swung to two inclined positions at opposite sides of the vertical.

A further object of my invention is to provide means by which a plurality of such egg holders may be simultaneously swung.

My invention provides further a frame which supports the egg holders being adapted to be removably mounted in an ordinary incubator tray for holding eggs.

A further object of my invention is to provide a device of the kind described, which is simple, cheap, durable, not liable to get out of order, which is easy to operate and is efficient in operation, and which is adapted for use in the ordinary egg holding trays now on the market.

The novel features of my invention are hereinafter fully described and claimed.

In the accompanying drawing, which illustrates the preferred embodiment of my invention, Fig. 1 is a perspective view of my improved egg turning device shown mounted in an ordinary egg holding tray, which is partly broken away.

Fig. 2 is a cross section on the line 2—2 of Fig. 1,

Fig. 3 is a cross section on the line 3—3 of Fig. 2,

Fig. 4 is an enlarged fragmental vertical sectional view of the egg turning device, in which two of the egg holders are shown mounted in the frame and in the two inclined positions in solid and dotted lines respectively.

Similar reference characters designate similar parts in the different views.

1 designates an ordinary rectangular egg holding tray having the usual screen wire bottom, 2. The egg turning device comprises a rectangular support which may comprise a frame 3, which is adapted to be removably mounted in the tray 1, and which has mounted in it a plurality of parallel horizontal egg holders, the ends of which are respectively pivoted to opposite vertical sides of the frame 3, by pins 4, so that each holder, which is designated by 5, may be swung to two inclined positions respectively at opposite sides of the vertical, as shown, in solid and dotted lines in Fig. 4.

The ends of the holders 5 may be metal plates connected by channel-shaped members of screen wire.

For simultaneously swinging the egg holders 5, to the two inclined positions named, there may be provided two holder swinging members 6 disposed parallel with each other, and each having fastened to it a handle 7, the two swinging members being pivoted to the adjacent end of the trays 5 by pins 8 which are disposed at equal distances from the axes constituting the pivot pins. The members 6 also perform the function of limiting the swing of the egg holders 5 to the two positions shown in Fig. 4, by contacting at their lower edges with the upper edges of the adjacent sides respectively of the frame 3. The use of two swinging members 6 is to prevent the twisting of the egg holders, such as might occur with the use of but one of such swinging members.

By removably mounting the frame 3 in the tray 1, the frame is supported and is adapted for use in the ordinary incubator tray, such as is on the market.

In the operation of my invention, the eggs are placed in a row, with the large ends of the eggs down, each tray having an open top, through which the eggs may be inserted. After the eggs have been for a certain period of time in the holders 5, with the latter in the positions shown in solid lines in Fig. 4, the handles are forced lengthwise so as to swing the holders to the positions shown in dotted lines in Fig. 4.

The egg holders may be swung back and forth as often as desired.

It will be noted that the holders 5 have V-shaped bottoms and parallel sides. This form provides a very stiff construction, thus enabling very light wire to be used without being distorted by the weight of the eggs. It also, by reason of the V-shaped bottom, and parallel sides, gives each egg, without regard to size, a three point bearing in either position of the holder, thus preventing the egg rolling about as it would on a curved bottom and flaring sides.

I will also be noted that the pivot pins 4 are disposed at substantial distances below the center of gravity of the holder. This causes the holders to be automatically retained in either position, particularly when the holders are only partly filled with eggs. With the center of gravity near the center or above the pivots, the weight of the eggs is liable to make the holders shift toward the vertical.

I do not limit my invention to the structure shown and described, as many modifications, within the scope of the appended claims, may be made without departing from the spirit of my invention.

What I claim is:—

1. In an egg turning device for incubators, a support, and an egg holder pivoted thereon to swing to two positions at opposite sides of the vertical, the holder having parallel sides and a V-shaped bottom, whereby each egg held therein will in either position of the holder have contact with one side of the holder and with both flaring portions of the bottom thereof.

2. In an egg turning device for incubators, a support, and an egg holder pivoted thereto at opposite ends at points disposed at a substantial distance below the center of gravity of the holder so as to swing to two positions at opposite sides respectively of the vertical, the holder having parallel sides and a V-shaped bottom, whereby each egg held therein will in either position contact with one side of the holder and with both flaring portions of the bottom thereof.

In testimony whereof I have signed my name to this specification.

JOSEPH McKEON.